Jan. 31, 1928.
W. C. KRENZ
1,657,757
LAWN MOWER SHARPENING MACHINE
Filed June 15, 1925    2 Sheets-Sheet 1
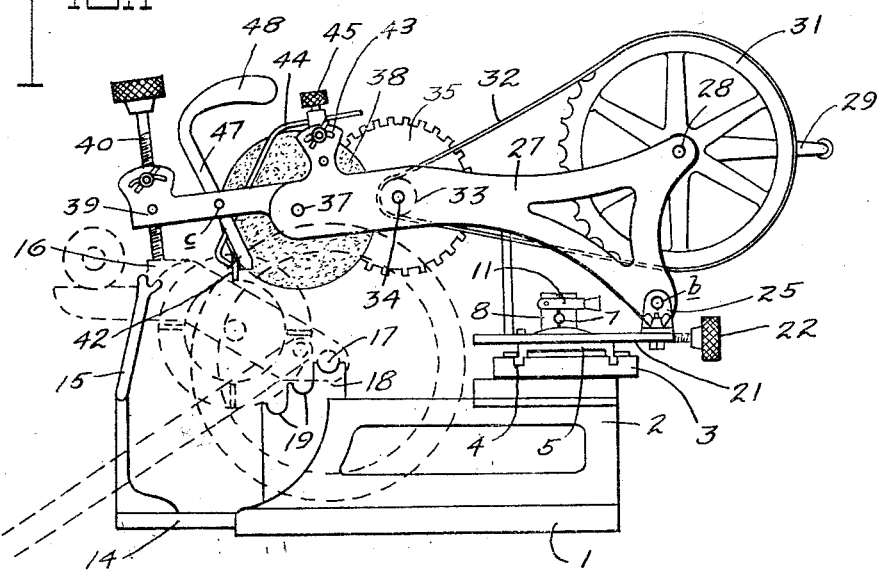
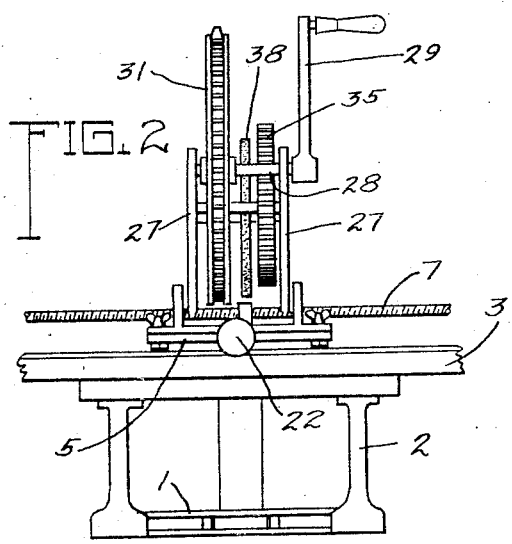
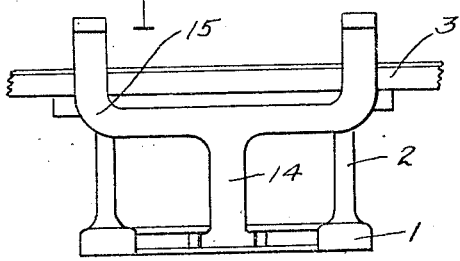
INVENTOR.
William C. Krenz.
BY Walter N. Haskell.
his ATTORNEY.

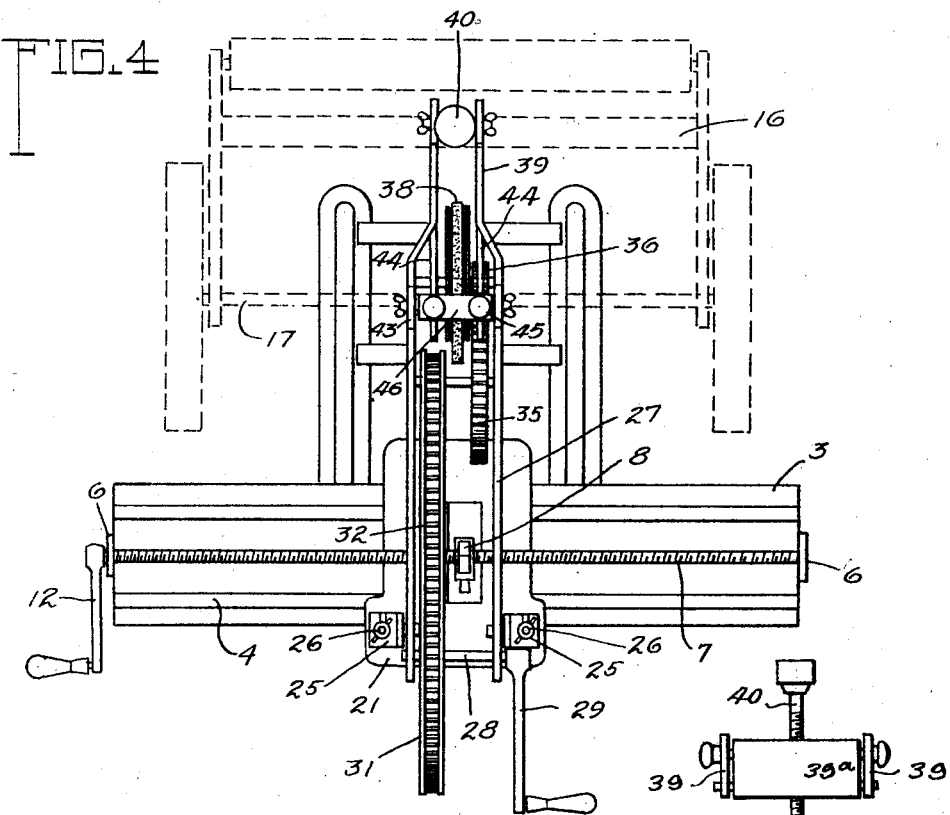

Patented Jan. 31, 1928.

1,657,757

UNITED STATES PATENT OFFICE.

WILLIAM C. KRENZ, OF DAVENPORT, IOWA.

LAWN-MOWER-SHARPENING MACHINE.

Application filed June 15, 1925. Serial No. 37,200.

My invention has reference to lawn mower sharpening machines, and aims to increase the efficiency and usefulness of such devices.

One of the purposes thereof is to provide a suitable base containing means for the support of a lawn mower in a position to be operated upon, and grinding devices mounted on said base, so as to be movable longitudinally thereof, so as to cause the grinding element to move along the blade that is being sharpened. Another purpose thereof is to provide means for gradual movement of the grinding mechanism from one end of the machine to the other, including a novel means for permitting a quick return of such mechanism to the starting point.

Another object of the invention is to provide a sliding support for that part of the machine which carries the grinding element, including an adjustment feature for positioning such element with relation to its work.

Another purpose thereof is to support the operating devices on the base of the machine in such a manner as to be readily detachable therefrom, to facilitate the transportation of the machine from one place to another. This renders it possible to carry the machine from house to house in an automobile or small truck, doing away with the necessity of taking the mowing machines to a machine shop in order to have the same sharpened.

Another feature thereof is the provision of mechanism for holding the blade that is being sharpened from movement while it is being operated upon.

Another advantage thereof consists in having the grinding mechanism mounted so as to be capable of adjustment to a limited degree transversely of the machine so that it can be adapted to lawn mowers of different makes.

The above-named, and other features and advantages of the invention will more fully appear from the following specification, reference being had to the accompanying drawings, in which;

Fig. 1 is an end view of the invention, with a lawn mower indicated therein in broken lines.

Fig. 2 is a fragmentary side view of the grinding wheel frame.

Fig. 3 is a detail of the support 15.

Fig. 4 is a plan view of the machine.

Fig. 5 is a detail of the split bearing 8—9.

Fig. 6 is a plan view of the plate 21 and appurtenant parts.

Fig. 7 is an end view of the arms 39, and parts supported thereby.

The reference number 1 indicates a base of suitable construction, supporting a frame 2, on which is mounted a bed-plate 3, of relatively greater length than that of an ordinary hand lawn-mower. Longitudinally of said bed-plate are channels 4 in which are slidable the runners of a carriage 5. Rotatably supported in bearings 6 at the ends of the bed-plate 3 is a screw-shaft 7, said shaft passing through an opening in a split bearing formed of parts 8 and 9, pivoted at their lower ends on the plate 5, so as to be capable of dropping away from each other. Said opening is threaded to correspond with the thread on the shaft 7, and the parts of the bearing are held normally closed by means of a latch 11, pivoted to the part 8. At one end of the shaft 7 is a crank 12, and upon the shaft being properly rotated thereby the carriage 5 is caused to move lengthwise of the plate 3. During the grinding operation the movement of the carriage would be practically continuous from one end of the machine to the other, for the purpose hereinafter set forth.

When it is desired to return the carriage to the starting point this can be done without interference by dis-engaging the latch 11, so that the parts 8 and 9 can separate, and disconnecting such parts from the shaft 7. The carriage and mechanism supported thereon can thereupon be moved freely in either direction.

At one side of the base 1 is an extension 14, supporting a forked frame 15, upon which is rested the cutter-bar 16 of a lawn-mower, indicated in broken lines in an inverted position, the tie-rod 17 of such machine being supported on a block 18 on the extension 14, said block being provided in its upper face with stepped recesses 19 to receive the rods of different makes of mowers. Supported on the carriage 5 is a plate 21, capable of adjustment transversely of said carriage by means of hand-screw 22, having a threaded end portion operable in a bearing 23 on the carriage 5, and having a collar 24 engaged by ears projected from the plate 21.

Fixed on the plate 21 is a pair of angle-plates 25, by means of bolts 26, to which angle-plates as shown at *b* in Fig. 1 is pivoted a frame 27, of double formation, in one end of which is journalled a shaft 28, provided at one end with a crank 29, by means of which the shaft may be operated. Fixed on said shaft is a sprocket-wheel 31, connected by a sprocket-chain 32 with a sprocket-wheel 33 on a shaft 34, also journalled in the frame 27. A gear-wheel 35 is also fixed on the shaft 34, in mesh with a gear-pinion 36 on a shaft 37, rotatably mounted in the frame 27. Secured on the shaft 37 is a grinding wheel 38, formed of emery or other abrasive material.

Projected from that end of the frame 27 which carries the wheel 38 is a pair of arms 39, between which is held a block 39ª, carrying an adjustment screw 40, the end of which rests upon the cutter bar 16, and is slidable lengthwise thereon. The free end of the frame 27 can thereby be positioned with the wheel 38 in operating engagement with one of the blades 42 of the reel.

The frame 27 is fitted with a pair of spaced supports 43, between which is pivoted a bar 46. Rods 44 are held in said bar, by means of setscrews 45. Said rods pass downwardly on each side of the wheel 38, and have bent ends which bear against the outer face of the blade 42 that is being sharpened, and prevent the same from moving away from the wheel.

Fulcrumed on one of the arms 39 is a lever 47, provided with a weighted handle 48, which holds the end of the lever in contact with the rear face of the blade 42, and keeps the same from vibrating or chattering while being operated upon. By throwing the handle 48 forwardly the end of the lever is held thereby in a disengaged position, permitting a change of blades in the machine that is being sharpened. In doing this the free end of the frame 27 is elevated a little, so that the grinder 38 will not interfere with the rotation of the lawn mower reel.

In operating the machine the cranks 12 and 29 are actuated coincidently, the movement of the shaft 7 causing the grinding devices to travel gradually from one end of the machine to the other, and at the same time the grinding wheel is operating on one of the blades. In case a little harder spot is encountered in the metal of the blade the movement of the shaft can be interrupted briefly, while the grinding wheel remains in motion. A uniform grinding of the blade is thus secured. The blade 42 that is being ground is positioned ahead of the center of the wheel 38, resulting in an angular and slightly arc-shaped cut on the edge of the blade.

By means of the set-screw 40 the position of the end of the frame carrying the grinding wheel can be adjusted with relation to the blade of the mower, so as to operate thereon with the desired amount of abrasive force.

By removing the bolts 26 the grinding mechanism can be quickly detached from the base of the machine, and conveyed separately therefrom, making it more convenient to transport the machine, when it is desired to do work therewith at different places.

What I claim, and desire to secure by Letters Patent is:

A device of the class described, comprising a base, adapted for the support of a lawn mower, in position to be sharpened, a carriage slidable on said base, and means for imparting a gradual movement thereto, a grinding mechanism hingedly mounted on said carriage, and provided in its movable end with a grinding wheel, adapted for operation on the blade of a mower supported by said base, a thumb-screw in the movable end of the frame of said grinding mechanism, adapted for slidable movement and to support the weight of the frame on the cutter bar of a mower supported on said base, a pair of rods supported in said frame and projected downwardly into position to bear against one of the reel blades of such mower, on the side thereof opposite to the grinding wheel, and a lever swingingly mounted and provided with a weighted handle, adapted to bear yieldably against such reel blade oppositely to said rods, said lever, rods, and grinding wheel being capable of vertical adjustment by the operation of said thumb-screw.

In testimony whereof I affix my signature.

WILLIAM C. KRENZ.